US009524618B2

(12) United States Patent
Shigeta

(10) Patent No.: US 9,524,618 B2
(45) Date of Patent: Dec. 20, 2016

(54) CARD READING DEVICE AND TABLETOP GAME SYSTEM

(75) Inventor: Yasushi Shigeta, Osaka (JP)

(73) Assignee: Angel Playing Cards Co., Ltd., Shiga (JP)

( * ) Notice: Subject to any disclaimer, the term of this patent is extended or adjusted under 35 U.S.C. 154(b) by 458 days.

(21) Appl. No.: 13/823,036

(22) PCT Filed: Sep. 12, 2011

(86) PCT No.: PCT/JP2011/005111
§ 371 (c)(1),
(2), (4) Date: Jun. 20, 2013

(87) PCT Pub. No.: WO2012/035742
PCT Pub. Date: Mar. 22, 2012

(65) Prior Publication Data
US 2013/0303277 A1    Nov. 14, 2013

(30) Foreign Application Priority Data

Sep. 14, 2010  (JP) ................................. 2010-205280

(51) Int. Cl.
G06F 17/00    (2006.01)
G06F 19/00    (2011.01)
(Continued)

(52) U.S. Cl.
CPC ............ *G07F 17/3293* (2013.01); *A63F 1/06* (2013.01); *G06K 7/00* (2013.01); *G07F 17/322* (2013.01);
(Continued)

(58) Field of Classification Search
CPC .................. A63F 1/14; A63F 1/18; H02J 9/04; H02J 9/06; H01M 2/1066
See application file for complete search history.

(56) References Cited

U.S. PATENT DOCUMENTS 3,841,637 A * 10/1974 Piazza et al. ............. 273/141 A
4,033,590 A *  7/1977 Pic ........................... 273/149 R
(Continued)

FOREIGN PATENT DOCUMENTS

CN        2662957 Y    12/2004
CN     101524589 A     9/2009
(Continued)

OTHER PUBLICATIONS

Chinese Patent Application No. 201180050190.2, Office Action and Search Report mailed Aug. 5, 2014.
(Continued)

*Primary Examiner* — Steven J Hylinski
(74) *Attorney, Agent, or Firm* — Chadbourne & Parke LLP

(57) ABSTRACT

A card reading device includes a card shoe part in which cards are housed, a card reading part that reads information on the cards drawn out, a control part that determines the outcome of a game based on the read information on the cards, and display parts that display the determined outcome of the game. In a tabletop game system, the information on the cards read by the card reading part and information on the game outcome determined by the control part are transmitted from the card reading device to a main computer apparatus via wireless communication. The card reading device includes a battery that supplies electric power to the control part, the display parts and a wireless output part. The card reading device, as such, is capable of facilitating moving the card reading device in a participatory tabletop game.

19 Claims, 6 Drawing Sheets

(51) Int. Cl.
  *G07F 17/32* (2006.01)
  *H01M 2/10* (2006.01)
  *H01M 10/42* (2006.01)
  *A63F 1/06* (2006.01)
  *G06K 7/00* (2006.01)
  *A63F 1/14* (2006.01)
  *A63F 1/18* (2006.01)

(52) U.S. Cl.
  CPC ......... *H01M 2/1016* (2013.01); *H01M 10/425* (2013.01); *A63F 1/14* (2013.01); *A63F 1/18* (2013.01)

(56) References Cited

U.S. PATENT DOCUMENTS

| | | | | |
|---|---|---|---|---|
| 4,315,162 A | * | 2/1982 | Ferguson | G06F 1/263 307/66 |
| 4,515,367 A | * | 5/1985 | Howard | A63F 1/12 273/149 R |
| 4,951,950 A | * | 8/1990 | Normand et al. | 273/149 P |
| 5,114,153 A | * | 5/1992 | Rosenwinkel | A63F 1/14 273/149 R |
| 5,122,927 A | * | 6/1992 | Satou | G06F 1/1616 361/679.09 |
| 5,148,042 A | * | 9/1992 | Nakazoe | G06F 1/1616 307/150 |
| 5,149,604 A | * | 9/1992 | Nakanishi | 429/97 |
| 5,169,155 A | * | 12/1992 | Soules et al. | 273/293 |
| 5,270,946 A | * | 12/1993 | Shibasaki | G06F 1/263 307/66 |
| 5,300,874 A | * | 4/1994 | Shimamoto | G06F 1/28 307/66 |
| 5,328,781 A | * | 7/1994 | Mikake | 429/97 |
| 5,374,061 A | * | 12/1994 | Albrecht | 273/149 R |
| 5,553,294 A | * | 9/1996 | Nanno | G06F 1/263 307/157 |
| 5,640,078 A | * | 6/1997 | Kou | H02J 7/0024 320/124 |
| 5,669,816 A | * | 9/1997 | Garczynski et al. | 463/12 |
| 5,739,596 A | * | 4/1998 | Takizawa | G06F 1/263 307/64 |
| 5,784,626 A | * | 7/1998 | Odaohara | H02J 1/10 307/66 |
| 5,832,282 A | * | 11/1998 | Pate | G06F 1/263 307/66 |
| 6,118,250 A | * | 9/2000 | Hutchison, IV | H02J 7/0024 320/110 |
| 6,160,702 A | * | 12/2000 | Lee | G06F 1/1635 361/679.32 |
| 6,167,289 A | * | 12/2000 | Ball | H02J 7/0073 455/572 |
| 6,259,171 B1 | * | 7/2001 | Cheng | G06F 1/263 307/44 |
| 6,268,711 B1 | * | 7/2001 | Bearfield | H02J 7/0024 320/116 |
| 6,452,362 B1 | * | 9/2002 | Choo | H02J 7/0013 320/116 |
| 6,582,301 B2 | * | 6/2003 | Hill | A63F 1/14 273/149 R |
| 6,605,923 B1 | * | 8/2003 | Kellogg | H02J 7/0013 320/110 |
| 6,638,161 B2 | * | 10/2003 | Soltys | A63F 1/18 273/138.2 |
| 6,652,379 B2 | * | 11/2003 | Soltys et al. | 463/22 |
| 6,685,568 B2 | * | 2/2004 | Soltys et al. | 463/47 |
| 6,702,672 B1 | * | 3/2004 | Angell et al. | 463/25 |
| 6,879,134 B2 | * | 4/2005 | Stanesti | H02J 7/0018 320/135 |
| 6,922,591 B2 | * | 7/2005 | Single | H04R 25/606 607/57 |
| 7,030,771 B2 | * | 4/2006 | Kinnard | G06F 1/263 307/65 |
| 7,737,581 B2 | * | 6/2010 | Spurlin | A61M 5/1723 307/66 |
| 7,919,885 B2 | * | 4/2011 | Woo | H02J 7/0013 307/80 |
| 8,239,696 B2 | * | 8/2012 | Zhao | G06F 1/263 713/300 |
| 2002/0068635 A1 | * | 6/2002 | Hill | 463/47 |
| 2002/0155869 A1 | * | 10/2002 | Soltys et al. | 463/11 |
| 2003/0054887 A1 | | 3/2003 | Dettrey et al. | |
| 2004/0143405 A1 | * | 7/2004 | Tsai | G06F 1/263 702/63 |
| 2004/0203897 A1 | * | 10/2004 | Rogers | H04W 16/18 455/456.1 |
| 2006/0290321 A1 | * | 12/2006 | Bhogal | G06F 1/263 320/128 |
| 2008/0018047 A1 | | 1/2008 | Schubert et al. | |
| 2008/0143048 A1 | | 6/2008 | Shigeta | |
| 2008/0182644 A1 | * | 7/2008 | Lutnick et al. | 463/20 |
| 2009/0284225 A1 | * | 11/2009 | Nakanuma | G06F 1/1626 320/134 |
| 2010/0093428 A1 | * | 4/2010 | Mattice et al. | 463/25 |

FOREIGN PATENT DOCUMENTS

| | | |
|---|---|---|
| JP | 2003250950 A | 9/2003 |
| JP | 2005296634 A | 10/2005 |
| JP | 2007236995 A | 9/2007 |
| JP | 2009213520 A | 9/2009 |
| WO | WO 9943094 A1 * | 8/1999 ......... H04B 1/3883 |
| WO | 2009110232 A1 | 9/2009 |

OTHER PUBLICATIONS

International Search Report of PCT/JP2011/005111 dated Oct. 18, 2011.

Australian Patent Application No. 2011303293, Notice of Acceptance mailed May 18, 2015.

\* cited by examiner (a)

(b)

CARD READING DEVICE AND TABLETOP GAME SYSTEM

TECHNICAL FIELD

The present invention relates to a card reading device used for a participatory tabletop game.

BACKGROUND ART

A tabletop game such as baccarat using playing cards (also referred to simply as "cards") has complicated rules that determine the outcome of the game. Therefore, when a dealer (a person who deals cards in the tabletop game) judges the outcome of the game, there is a possibility of the dealer making an erroneous judgment. Also, in such a tabletop game, a game participant (a person who participates in the tabletop game) may perform a fraudulent act (e.g., the act of secretly replacing a dealt card with a different one).

A card reading device has therefore been proposed that is used by being set on a game table, and that has a function to read a code printed on cards (see, for example, Patent Literature 1). On the surfaces of cards (the front surfaces, on which suits and ranks are printed), a code invisible to the human vision in ordinary use but recognizable with a predetermined recognition device is printed. The card reading device has a function to read this code.

The conventional card reading device has rules for determining the outcome of a game stored in itself to enable determination of the outcome of a game. Detection of a judgment error when a dealer makes an erroneous outcome judgment is enabled thereby. In the conventional card reading device, information on cards (the suits and ranks of the cards) is read when the cards are put out. Therefore, if a game participant or the like replaces one of the cards, a discrepancy occurs between information on the card read by the card reading device and information on the replaced card. Thus, the card reading device is capable of easily detecting replacement of cards and preventing a fraudulent act performed by a game participant or the like.

A communication cable for connection to an external device (a display device, a computer system, or the like) is connected to such a conventional card reading device to display the outcome of a game on a screen or the like. A power supply cable is also connected to supply electric power to the card reading device.

In a tabletop game such as baccarat, it is a general rule to put out cards from a card shooter device by the hand of a dealer. However, a "participatory" game is conceivable in which, for the purpose of making the tabletop game more interesting, a game participant participating in betting is permitted to put out cards from a card shooter device if the participant wishes to do so.

In such a participatory tabletop game (in which a game participant draws cards), there is a need to move a card reading device on the game table from a position in front of a dealer to a position in front of a game participant. In the participatory tabletop game, the operation to move the card reading device is frequently performed.

However, since the communication cable and the power supply cable are connected to the conventional card reading device, the communication cable and the power supply cable are inconvenient when the card reading device is moved in a participatory tabletop game. In such a case, it is difficult to move the card reading device. Thus, the communication cable and the power supply cable conventionally provided are a hindrance to the realization of a participatory tabletop game. The communication cable and the power supply cable are also a hindrance to the operation to set the card reading device on the game table and to maintenance operations. In some cases, the communication cable or the power supply cable may become a cause of a malfunction.

CITATION LIST

Patent Literature

Patent Literature 1: Japanese Patent Laid-Open No. 2005-296634

SUMMARY OF INVENTION

Technical Problem

The present invention has been achieved under the above-described circumstances. An object of the present invention is to provide a card reading device capable of facilitating moving the card reading device in a participatory tabletop game.

Solution to Problem

According to one aspect of the present invention, there is provided a card reading device. This card reading device includes a card shoe part having a card container portion that contains a plurality of cards, a detachable cover disposed above the card container portion, and an opening through which the card can be taken out one by one from the card container portion, a card reading part in which information attached to the cards drawn out from the card container portion onto a game table is read from each of the cards, a control part that determines the outcome of a card game based on the information on the cards read in the card reading part, a display part that outputs the game outcome determined by the control part, a wireless output part that transmits, to an external device, via wireless communication, the information on the cards successively read in the card reading part and information on the game outcome determined by the control part together with an ID for identification of the card reading device, and a battery that supplies electric power to the control part, the display part and the wireless output part. The card shoe part, the card reading part, the control part, the display part and the wireless output part can be placed on the game table by being integrally combined with each other, and the battery is detachably attached to the card reading device.

According to another aspect of the present invention, there is provided a tabletop game system constituted of a card reading device and a main computer apparatus. The card reading device includes a card shoe part having a card container portion that contains a plurality of cards, a detachable cover disposed above the card container portion, and an opening through which the card can be taken out one by one from the card container portion, a card reading part in which information attached to the cards drawn out from the card container portion onto a game table is read from each of the cards, a control part that determines the outcome of a card game based on the information on the cards read in the card reading part, a display part that outputs the game outcome determined by the control part, a wireless output part that transmits, to the main computer apparatus, via wireless communication, the information on the cards successively read in the card reading part and information on the game outcome determined by the control part together with an ID for identification of the card reading device, and a battery that supplies electric power to the control part, the display part and the wireless output part. The card shoe part, the card reading part, the control part, the display part and the wireless output part can be placed on the game table by being integrally combined with each other, and the battery is detachably attached to the card reading device. The main computer apparatus includes an acceptance determination section that receives the information transmitted from the wireless communication part in the card reading device and accepts the information on the game outcome transmitted from the card reading device if the received ID coincides with an ID set in advance.

According to still another aspect of the present invention, there is provided a tabletop game system constituted of a plurality of cards, a card reading device and a main computer apparatus. Each of the plurality of cards has a code expressing information on the card and attached to one surface of the card in ink reactive to ultraviolet light. The card reading device includes a card shoe part having a card container portion that contains a plurality of cards, a detachable cover disposed above the card container portion, and an opening through which the card can be taken out one by one from the card container portion, a card reading part in which information attached to the cards drawn out from the card container portion onto a game table is read from each of the cards, a control part that determines the outcome of a card game based on the information on the cards read in the card reading part, a display part that outputs the game outcome determined by the control part, a wireless communication part that transmits, to the main computer apparatus, via wireless communication, the information on the cards successively read in the card reading part and information on the game outcome determined by the control part together with an ID for identification of the card reading device, and a battery that supplies electric power to the control part, the display part and the wireless output part. The card shoe part, the card reading part, the control part, the display part and the wireless communication part can be placed on the game table by being integrally combined with each other, and the battery is detachably attached to the card reading device. The main computer apparatus includes an acceptance determination section that receives the information transmitted from the wireless communication part in the card reading device and accepts the information on the game outcome transmitted from the card reading device if the received ID coincides with an ID set in advance.

There are other aspects of the present invention, as described below. Accordingly, this disclosure of the invention is intended to propose part of the aspects of the present invention and is not intended to limit the scope of the invention described and claimed here.

DESCRIPTION OF EMBODIMENTS

Figure 1:
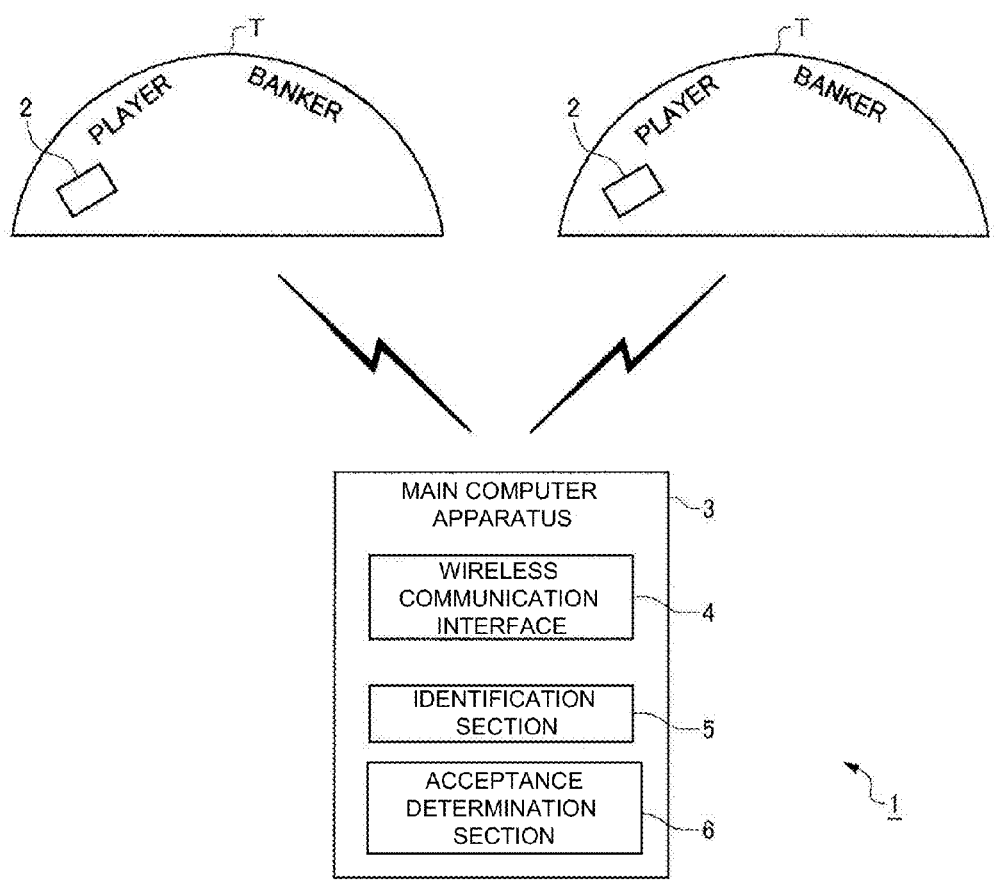
FIG. 1 is a diagram showing the configuration of a tabletop game system in an embodiment of the present invention.

The present invention will be described below in detail. The following detailed description and the attached drawings are not limiting of the present invention.

A card reading device of the present invention is a device including a card shoe part having a card container portion that contains a plurality of cards, a detachable cover disposed above the card container portion, and an opening through which the card can be taken out one by one from the card container portion, a card reading part in which information attached to the cards drawn out from the card container portion onto a game table is read from each of the cards, a control part that determines the outcome of a card game based on the information on the cards read in the card reading part, a display part that outputs the game outcome determined by the control part, a wireless output part that transmits, to an external device, via wireless communication, the information on the cards successively read in the card reading part and information on the game outcome determined by the control part together with an ID for identification of the card reading device, and a battery that supplies electric power to the control part, the display part and the wireless output part, wherein the card shoe part, the card reading part, the control part, the display part and the wireless output part can be placed on the game table by being integrally combined with each other, and the battery is detachably attached to the card reading device.

With this arrangement, information on the cards read by the card reading part and information on the game outcome determined by the control part are transmitted from the wireless output part to the external device (a main computer apparatus or the like) via wireless communication and, therefore, the need for a communication cable such as that in the conventional arrangement is eliminated. The need for a power supply cable such as that in the conventional arrangement is also eliminated since electric power is supplied from the battery to the control part, the display part and the wireless output part. Thus, according to the present invention, the need for a communication cable and a power supply cable such as those in the conventional arrangement can be eliminated. As a result, the operation to move the card reading device from a position in front of a dealer to a position in front of a game participant in a so-called participatory tabletop game is facilitated. Moreover, the operation to place the card reading device on the game table and maintenance operations are facilitated. Further, prevention of the occurrence of malfunctions due to the conventional communication cable and power supply cable is enabled.

The card reading device of the present invention may further include a transmission setting section that determines timing of transmission in the wireless output part.

Transmission of the information on the cards and the information on the game outcome at a suitable timing is enabled thereby.

In the card reading device of the present invention, the transmission setting section may determine timing of the transmission so that after a predetermined number of the cards is read in the card reading part, the information on the cards read from the cards is transmitted.

Transmission of the information on a predetermined number of cards and the information on the game outcome at a suitable timing after read of the predetermined number of cards in the card reading part is enabled thereby.

In the card reading device of the present invention, the transmission setting section may determine timing of the transmission by a predetermined program.

Transmission of the information on the cards and the information on the game outcome at a suitable timing determined by the program is enabled thereby.

In the card reading device of the present invention, the battery may be attached to the cover.

Since the battery is attached to the cover, the cover with the battery can be replaced with another cover to which a charged battery is attached when the cover is removed for the purpose of replacing the cards in the card container portion with a plurality of new decks of cards after the completion of a round of game play. This enables prevention of the occurrence of the worst state in which the remaining charges in the battery is so reduced in the course of a round of game play (before the appearance of a cut card) that the game is discontinued.

The card reading device of the present invention may further include an auxiliary battery that supplies electric power to the control part and the wireless output part when the battery is removed from the card reading device or when the amount of charge in the battery becomes equal to or smaller than a predetermined threshold value.

This arrangement enables supply of electric power from the auxiliary battery instead of from the above-described battery when the battery is removed or the amount of remaining charge in the battery is small.

The card reading device of the present invention may further include a battery switching part that performs control so that electric power to the control part and the wireless output part is supplied from one of the battery and the auxiliary battery or from both the two batteries.

Appropriate supply of electric power from one of the battery and the auxiliary battery or from both the two batteries is enabled thereby.

The card reading device of the present invention may further include a detection notification section that detects opening of the cover and transmits a notice of the occurrence of opening of the cover to the external device through the wireless output part.

Appropriately detecting opening of the cover is enabled thereby.

A tabletop game system of the present invention is a system constituted of a card reading device and a main computer apparatus, the card reading device including a card shoe part having a card container portion that contains a plurality of cards, a detachable cover disposed above the card container portion, and an opening through which the card can be taken out one by one from the card container portion, a card reading part in which information attached to the cards drawn out from the card container portion onto a game table is read from each of the cards, a control part that determines the outcome of a card game based on the information on the cards read in the card reading part, a display part that outputs the game outcome determined by the control part, a wireless output part that transmits, to the main computer apparatus, via wireless communication, the information on the cards successively read in the card reading part and information on the game outcome determined by the control part together with an ID for identification of the card reading device, and a battery that supplies electric power to the control part, the display part and the wireless output part, wherein the card shoe part, the card reading part, the control part, the display part and the wireless output part can be placed on the game table by being integrally combined with each other, the battery is detachably attached to the card reading device, and the main computer apparatus includes an acceptance determination section that receives the information transmitted from the wireless communication part in the card reading device and accepts the information on the game outcome transmitted from the card reading device if the received ID coincides with an ID set in advance.

This tabletop game system also enables elimination of a communication cable and a power supply cable such as those in the conventional arrangement. As a result, the operation to move the card reading device from a position in front of a dealer to a position in front of a game participant in a so-called participatory tabletop game is facilitated. Moreover, the operation to place the card reading device on the game table and maintenance operations are facilitated. Further, prevention of the occurrence of malfunctions due to the conventional communication cable and power supply cable is enabled.

The tabletop game system of the present invention may include a plurality of card reading devices, and one common computer apparatus as the main computer apparatus with respect to the plurality of card reading devices. The plurality of card reading devices each may have IDs different from each other, each ID for identification of the corresponding card reading device. The main computer apparatus may include an identification section that identifies the IDs of the plurality of card reading devices different from each other.

Appropriate management of the plurality of card reading devices by one main computer apparatus is enabled thereby.

Another tabletop game system of the present invention is a system constituted of a plurality of cards, a card reading device and a main computer apparatus, each of the plurality of cards having a code expressing information on the card, the code being attached to one surface of the card in ink reactive to ultraviolet light, the card reading device including a card shoe part having a card container portion that contains the plurality of cards, a detachable cover disposed above the card container portion, and an opening through which the card can be taken out one by one from the card container portion, a card reading part in which information attached to the cards drawn out from the card container portion onto a game table is read from each of the cards, a control part that determines the outcome of a card game based on the information on the cards read in the card reading part, a display part that outputs the game outcome determined by the control part, a wireless communication part that transmits, to the main computer apparatus, via wireless communication, the information on the cards successively read in the card reading part and information on the game outcome determined by the control part together with an ID for identification of the card reading device, and a battery that supplies electric power to the control part, the display part and the wireless output part, wherein the card shoe part, the card reading part, the control part, the display part and the wireless communication part can be placed on the game table by being integrally combined with each other, the battery is detachably attached to the card reading device, and the main computer apparatus includes an acceptance determination section that receives the information transmitted from the wireless communication part in the card reading device and accepts the information on the game outcome transmitted from the card reading device if the received ID coincides with an ID set in advance.

This tabletop game system also enables elimination of a communication cable and a power supply cable such as those in the conventional arrangement. As a result, the operation to move the card reading device from a position in front of a dealer to a position in front of a game participant in a so-called participatory tabletop game is facilitated. Moreover, the operation to place the card reading device on the game table and maintenance operations are facilitated. Further, prevention of the occurrence of malfunctions due to the conventional communication cable and power supply cable is enabled.

In the tabletop game system of the present invention, the code expressing the information on each of the cards may be printed at two opposite sides of the card along a direction in which the card is drawn out.

Appropriate read of the code printed on each card is enabled thereby.

According to the present invention, it is possible to facilitate moving the card reading device in a participatory tabletop game.

Embodiment

A card reading device in a tabletop game system according to an embodiment of the present invention will be described with reference to the drawings. The present embodiment will be described by way of example with respect to the case of a card reading device in a tabletop game system used for a participatory baccarat game or the like performed in a casino or the like.

FIG. 1 is a diagram showing the configuration of a tabletop game system according to the present embodiment. As shown in FIG. 1, a tabletop game system 1 is constituted of a plurality of card reading devices 2 and one main computer apparatus 3. Each of the card reading devices 2 is placed on each game table T and used for a tabletop game performed on the table T. The main computer apparatus 3 is placed in a game monitoring pit or a central monitoring room (not shown).

The configuration of the main computer apparatus 3 will first be described with reference to FIG. 1. As shown in FIG. 1, the main computer apparatus 3 includes a wireless communication interface 4 for performing wireless communication with each of the plurality of card reading devices 2, and an identification section 5 that identifies IDs for the plurality of card reading devices 2 (IDs different from each other). The main computer apparatus 3 also includes an acceptance determination section 6 that accepts information on a game outcome (described below) from one of the card reading device 2 if an ID received from the card reading device 2 coincides with an ID set in advance.

Figure 2:
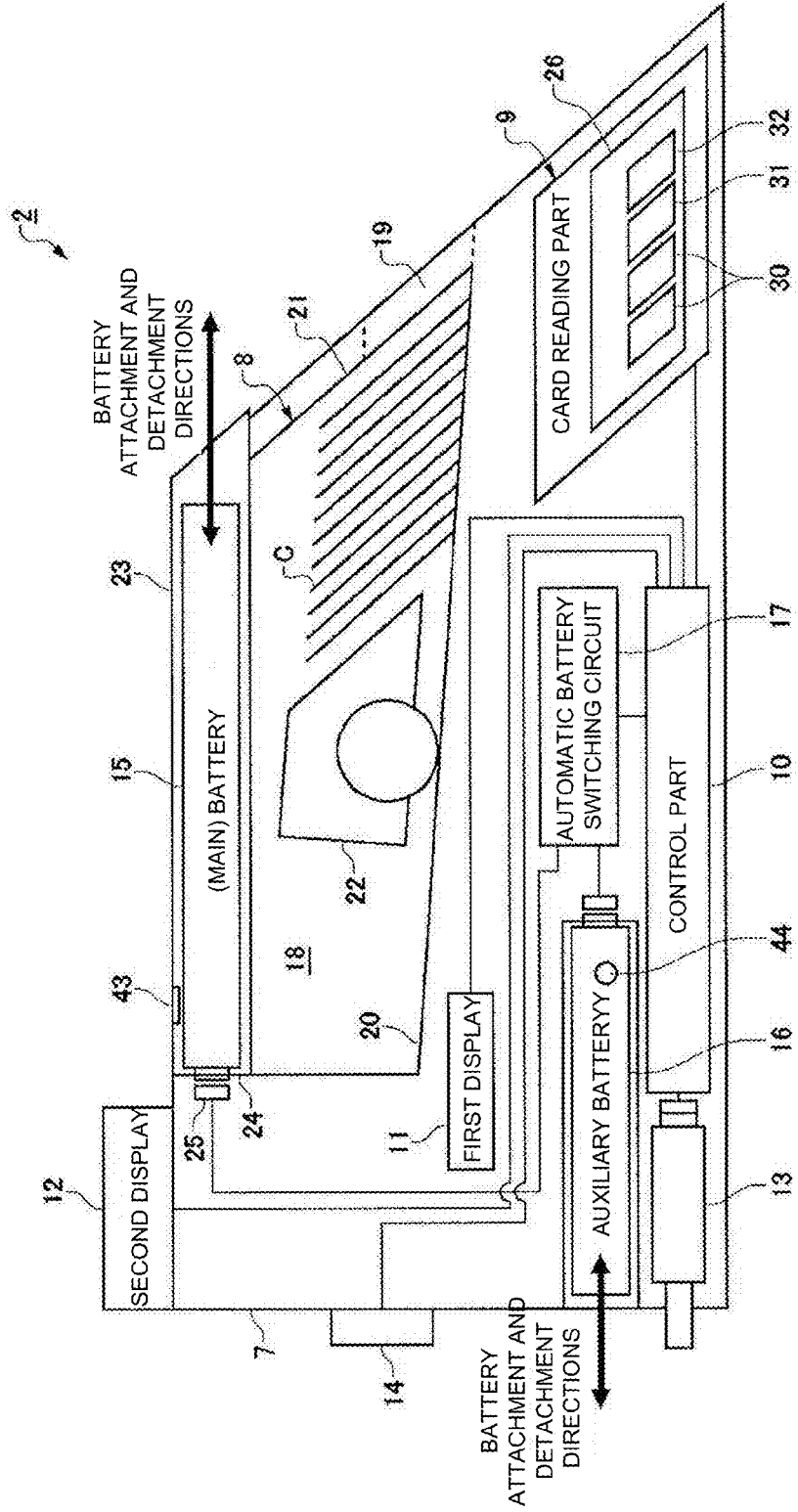
FIG. 2 is a diagram showing the construction of a card reading device in the embodiment of the present invention.

The construction of each card reading device 2 will next be described. FIG. 2 is a diagram showing the construction of the card reading device 2. As shown in FIG. 2, the card reading device 2 has a housing 7. The housing 7 includes a card shoe part 8 and a card reading part 9. As shown in FIG. 1, the card reading device 2 also includes a control part 10, a first display part 11 and a second display part 12. The card reading device 2 further includes a wireless output part 13 and a transmission permission button 14. The first display part 11 is, for example, a monitor, and the second display part 12 is, for example, three lamps (win, loss and draw lamps). The wireless output part 13 has, for example, a function to perform wireless communication based on Bluetooth (R) or the like.

It can be said that the card reading device 2 is formed by integrally combining the card shoe part 8, the card reading part 9, the control part 10, the first display part 11 and the second display part 12, and that these parts can be placed on the game table by being integrally combined with each other. The card reading device 2 is black in color and made of a resin as a whole.

The card reading device 2 also includes a battery 15 and an auxiliary battery 16 for supplying electric power to its parts (control part 10, first display part 11, second display part 12, and wireless output part 13). The card reading device 2 further includes a battery switching circuit 17 for selecting between supply of electric power from one of the battery 15 and the auxiliary battery 16 to the parts and supply of electric power from both the battery 15 and the auxiliary battery 16 to the parts.

The construction of each part in the card reading device 2 will be described in detail. The construction of the card shoe part 8 will first be described by referring to FIG. 2. As shown in FIG. 2, the card shoe part 8 includes a card container portion 18 containing a plurality of cards C, and an opening 19 through which the cards C can be taken out by being slid from the card container portion 18. A floor 20 and a front wall 21 of a card accommodation portion are slanted, as shown in FIG. 2. In the card accommodation portion, a batch of cards C are pressed forward by a card pressing member 22 with a roller to be pressed against the front wall 21. The front wall 21 has the U-shaped opening 19 in at a lower position. A dealer takes out the cards C from the opening 19 onto the game table T through the card reading part by sliding the cards C. The front wall 21 may be covered with a piece of black cloth, which is not illustrated, in order that the cards C cannot be seen through the opening 19.

A detachable cover 23 is attached above the card container portion. The battery 15 is mounted at the back of the cover 23. The battery 15 can be attached or detached together with the cover 23. A terminal 25 to which the battery 15 is connected is provided in a receiving portion 24 for receiving the cover 23. The terminal 25 is connected to the control part 10 to supply electric power from the battery 15 to the components including the first display part 11, the second display part 12 and the wireless output part 13 through the control part 10. At the time of interchange of the battery 15, or attachment or detachment of the cover 23, electric power is supplied from the auxiliary battery 16.

At the time of attachment or detachment of the cover 23, electric power is supplied from the auxiliary battery 16 since the battery 15 attached to the cover 23 is also detached. The battery 15 attached to the cover 23 is charged by a charger (not shown). The cover 23 to which a charged spare battery 15 is attached is prepared to enable a tabletop game to be smoothly conducted.

Figure 3:
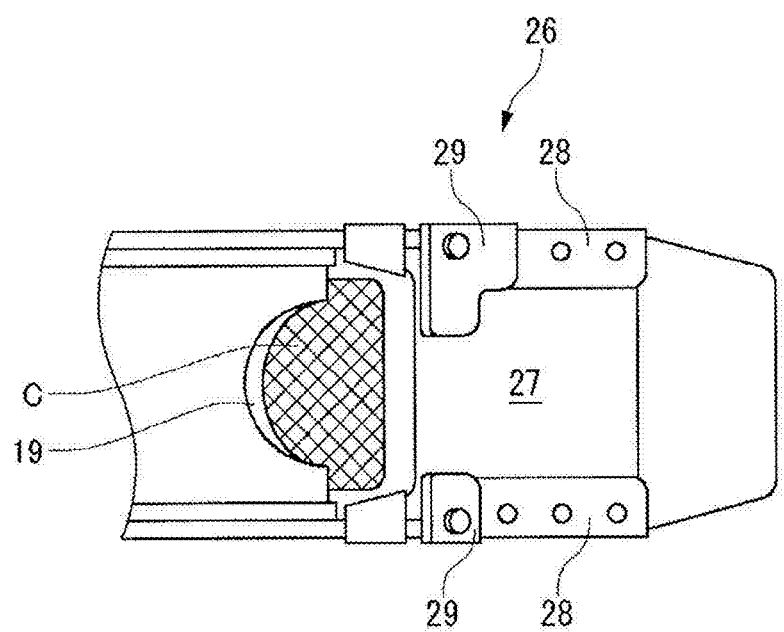
FIG. 3 is a plan view showing the construction of a card reading part in the card reading device.
Figure 4:
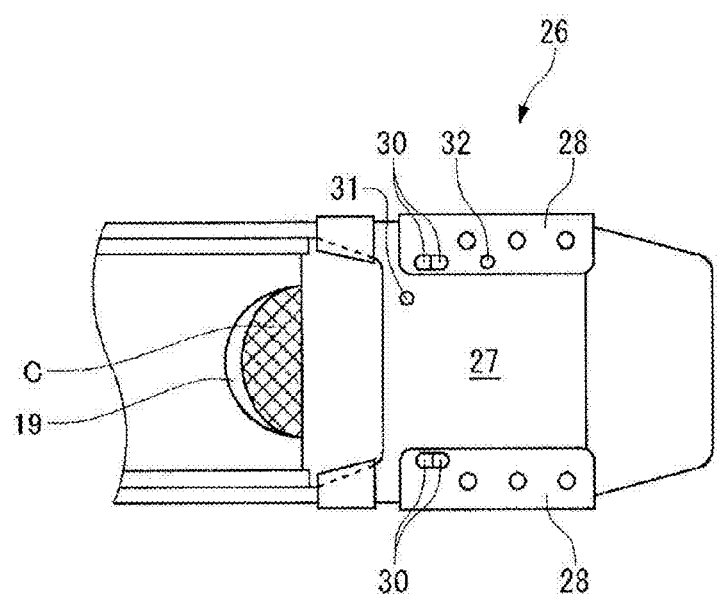
FIG. 4 is a plan view of the card reading part in a state where a sensor cover is removed.

The construction of the card reading part 9 will be described by also referring to FIGS. 3 and 4. FIGS. 3 and 4 are diagrams showing the card reading part. As shown in FIGS. 2 to 4, the card reading part 9 includes a card reading sensor part 26 that reads information on the cards (suits and ranks) from the cards C while the cards C taken out one after another from the opening 19 are guided and taken out onto the game table T. The card reading part 9 is provided below the opening 19 of the card shoe part 8 and incorporated in the housing 7 integrally with the card shoe part 8.

The card reading part 9 has a card guide surface 27, which is a slanting surface. The card guide surface 27 continues to the opening 19. The card guide surface 27 extends forward and downward from the opening 19 and its lower end continues to the game table T. The card guide surface 27 serves as a measurement surface for card reading.

Card guide rails 28 are mounted on opposite side portions of the card guide surface 27. A card path gap, not illustrated in the figure, is formed between the card guide rail 28 and the card guide surface 27. The size of the card path gap is set to a value slightly larger than the thickness of the cards C. Each card C passes over the card guide surface 27 after being drawn out from the card shoe part 8. At this time, opposite end portions of the card C pass through the card path gap.

A sensor cover 29 is mounted on each of the two card guide rails 28 with a screw, as shown in FIGS. 3 and 4. When the sensor covers 29 are removed, four sensors in the card reading sensor part 26 are exposed. The four sensors are two black-light sensors 30 (also referred to as "UV sensor"), an object detection sensor 31 and a measurement effectiveness determination sensor 32. These four sensors are provided in the card guide surface 27.

As shown in FIGS. 3 and 4, the UV sensors 30 are positioned on the card guide surface 27 comparatively close to the upstream end of the card guide surface 27 in the card C flow direction. The UV sensors 30 are also disposed in a space in the housing 7, fixed to a ceiling surface (a surface at the back of the card guide surface 27) and exposed through the card guide surface 27.

Each UV sensor 30 includes an LED (ultraviolet LED) that emits ultraviolet light and a detector. Each card C is irradiated with ultraviolet light (black light) and a code on the card is detected with the detector. A code for the ranks (A, 1 to 10, J, Q, and K) of the cards C is printed on the cards C in ultraviolet emission ink capable of developing a color when irradiated with ultraviolet light, as described later. The UV sensors 30 are connected to the control part 10. In the control part 10, the numbers on the cards C are determined from signals output from the detectors in the UV sensors 30.

Figure 5:
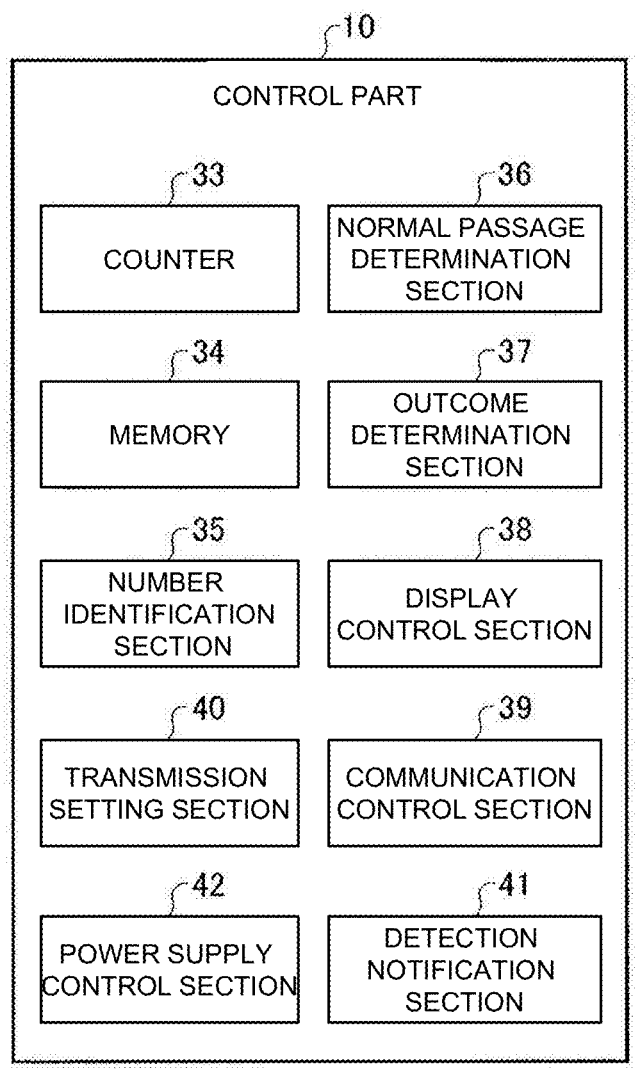
FIG. 5 is a block diagram showing the configuration of a control part in the card reading device.

The configuration of the control part 10 will be described with reference to FIG. 5. FIG. 5 is a block diagram showing the configuration of the control part 10. As shown in FIG. 5, the control part 10 includes a counter 33, a memory 34, a number identification section 35 and a normal passage determination section 36. The counter 33 counts the number of cards C dealt onto the game table T. The control part 10 also includes an outcome determination section 37 that determines the outcome of a card game based on information on the cards from the card reading part 9, a display control section 38 that controls display on the first display part 11 and the second display part 12, a communication control section 39 that controls the wireless output part 13, and a transmission setting section 40 that determines timing of transmission in the wireless output part 13. In the memory 34, read data read from the cards C with the card reading sensor part 26 and processed by the control part 10 and the result of determination of the outcome of a game described below are temporarily stored.

The control part 10 also includes a detection notification section 41 that detects opening of the cover 23 when the cover 23 is opened, transmits a notice of this to an external device (main computer apparatus 3 or the like) through the wireless output part 13, and a power supply control section 42 that controls switching between the battery 15 and the auxiliary battery 16. The power supply control section 42 performs control so that electric power is supplied from the auxiliary battery 16 instead of from the battery 15, for example, when the battery 15 is removed or when the remaining amount of charge in the battery 15 is small. The power supply control section 42 also enables efficient use of the two batteries by performing control through the battery switching circuit 17 so that the battery 15 and the auxiliary battery 16 are selectively connected in series or in parallel with each other. Further, the power supply control section 42 functions to charge the auxiliary battery 16 from the battery 15 when the battery 15 is replaced with a charged high-capacity battery 15. The card reading device 2 in the present embodiment is provided with a remaining charge indication lamp 43 for indicating the remaining amount of charge in the battery 15 and a remaining charge indication lamp 44 for indicating the remaining amount of charge in the auxiliary battery 16. The power supply control section 42 and the battery switching circuit 17 correspond to the battery switching section of the present invention.

The control part 10 is a computer and connected to the UV sensors 30, the object detection sensor 31 and the measurement effectiveness determination sensor 32. The control part 10 is also connected to the monitor provided as first display part 11 and the three lamps provided as second display part 12 to control display on the monitor and the lamps.

The computer provided as control part 10 has a processing function (outcome determination section 37) to automatically determine the outcome of a game. This function is realized by incorporating an outcome determination program in the computer. This program is executed by a processor in the computer.

In determination processing, the computer obtains, by using the UV sensors 30, the ranks of the cards successively taken out from the card shoe part 8 onto the game table T. The obtained ranks of the cards are successively stored in the memory 34. Information about to which players the cards C have been dealt is simultaneously stored. That is, the ranks of the cards are stored by being associated with the players to whom the cards are dealt.

The card shooter device in the present embodiment is used for a baccarat game, in which two persons: a player and a banker exist (these two persons are referred to as players in this specification). To which player the next card C is dealt is uniquely determined from the number of cards C dealt before and the ranks of the cards. By referring to the ranks of the cards stored in the memory 34, the computer provided as control part 10 determines to which player each card C read with the UV sensors 30 is dealt. The ranks of the dealt cards are stored in the memory 34 by being associated with the players.

The computer reads out from the memory 34 the ranks (numbers) of the cards dealt to the two players and compares the hands of the two players based on the rules of the baccarat game by a program stored in advance, thereby determining the outcome. The numbers on the cards are totalized; the totalized numbers are compared; and determination is made as to which player wins and whether or not the outcome is a draw.

Thus, in the case of baccarat, the outcome can be automatically determined only from the ranks (numbers) of the cards successively taken out of the card shooter device. Detection of to which player each card C has been dealt may not be performed by using other sensors (e.g., sensors separately embedded in the table T). The result of this determination is stored in the memory 34.

The control part 10 outputs the game outcome to the first display part 11 and the second display part 12. The read numbers, the game outcome and other sorts of information are displayed on the first display part 11. One of the banker win lamp, the draw lamp and the player win lamp is lit on the second display part 12 according to the game outcome.

The card reading device 2 transmits to the external device (main computer apparatus 3 or the like) the information (read data) on the cards read from the cards C with the card reading sensor part 26 and the game outcome determined by the control part 10 together with the ID for identification of itself. The transmission setting section 40 in the control part 10 has a function to determine timing of this transmission. The transmission is temporarily stored in the memory 34 in the control part 10 without being performed immediately after the completion of the card read processing operation and the results of determination of the game outcome. When the transmission permission button 14 is pressed by the dealer (operator), the read data and the game outcome temporarily stored in the memory 34 are transmitted from the wireless output part 13 to the external device (main computer apparatus 3 or the like) under the control of the communication control section 39.

The arrangement may alternatively be such that transmission to the external device (main computer apparatus 3) is automatically performed by the program in the transmission setting section 40 without the operation of the transmission permission button 14 when, after the completion of dealing of two cards C to each of the banker and the player (a total of four cards), the fifth card C is drawn, or transmission to the external device (main computer apparatus 3) is automatically performed by the program in the transmission setting section 40 at the stage where the result of outcome determination is obtained.

The transmission setting section 40 may have a function to transmit information on a predetermined number of cards (e.g., the number of cards corresponding to one game) read by the card reading part 9 after reading of these cards. Also in such a case, the transmission setting section 40 may determine by the predetermined program timing of transmission of the information on the cards successively read by the card reading part 9 and the game outcome determined by the control part 10.

Figure 6:
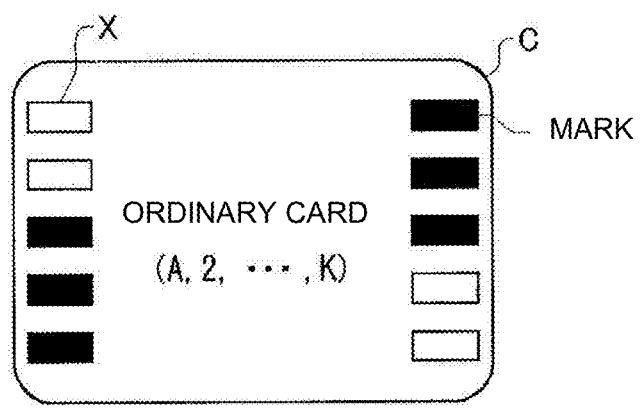
FIG. 6(a) is a diagram showing a card to which a code is attached.
FIG. 6(b) is a diagram showing a cut card.
Figure 6:
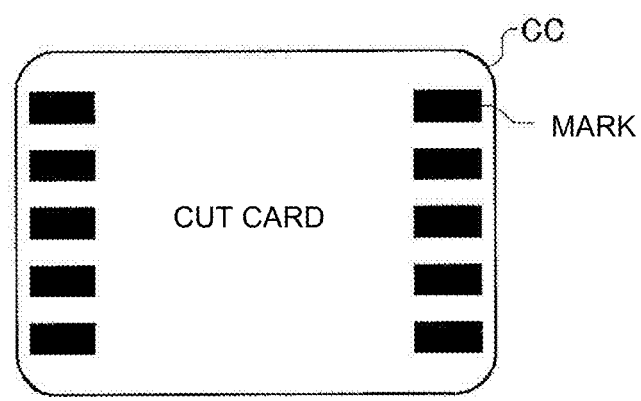

Determination of the ranks of the cards will be described with reference to FIG. 6. In the present embodiment, as shown in FIG. 6(a), a code X expressing information on each card is point-symmetrically printed on the card C at two opposite end sides of the same along a direction in which the card is drawn out. As a code for identifying the rank of the card, a plurality of rectangular marks, for example, are arranged along the edges of the card C. The marks constitute the code for the rank of the card, and the code expresses the rank of the card. When one of the UV sensors 30 detects one of the marks, it outputs an ON signal. Accordingly, the UV sensors 30 at the two edges output ON signals from the marks with respect to the rank. The control part 10 counts the ON signals input from the two UV sensors 30. The code formed of the two marks detected with the two UV sensors 30 are thereby read. The control part 10 identifies the rank of the card based on the code formed of the marks.

One-to-one correspondence between the mark code and the rank of the card may suffice. In the control part 10, the numbers on the cards may be determined by comparing the detected mark codes with the codes formed of the marks registered in advance.

In the baccarat game, "J", "Q" and "K" are treated as equivalent to "10" (treated as "0" in the baccarat game). Then, the same code for "10" may be attached to "J", "Q" and "K". A code expressing suits (spades, hearts, diamonds and clubs) may be attached to the cards C in addition to that for the card ranks and may be read. Thus, if the ranks of the cards necessary for a game can be expressed by a code within the scope of the present invention, the form of the code is not restrictively specified.

In the present embodiment, the card reading device 2 includes the UV sensors 30 that detect marks from cards C and output signals. Each UV sensor 30 outputs the ON signal during passage of the mark. A code formed of a predetermined number of marks is provided on each card C. The marks are provided in side portions and are therefore arranged along the card drawing out direction so as to pass by the UV sensors 30. The mark code is associated with the numbers on the cards. The control part 10 identifies each card C from the detection signals from the UV sensors 30.

The card reading device 2 in the present embodiment is provided with the two UV sensors 30. Accordingly, marks are arranged along the two edges of the ordinary cards C (i.e., cards "A", "2", . . . "K") in correspondence with the UV sensors 30 on the opposite sides, as shown in FIG. 6(a). These marks are read with the UV sensors 30 on the opposite sides. The marks are favorably provided in areas where no illustration or pattern exists. However, the actual marks are normally invisible.

In the present embodiment, a predetermined number of marks are favorably arranged along each edge of each card C. The marks may be arranged in one row, two row or three or more rows. In a case where two rows of marks favorably provided along each of the two edges of each card C, the number of UV sensors 30 and the disposition of the UV sensors are suitably adjusted according to the rows of marks. Two arrays of marks identical to each other and each consisting of two or three rows of marks may be provided point-symmetrically about a center of each card C to enable removal of one of the UV sensors provided in the opposite side portions of the card guide surface 27.

A cut card CC will be described with reference to FIG. 6(b). The cut card CC is a card used in a casino or the like. A plurality of decks (e.g., four decks, six decks or eight decks) of cards C are ordinarily housed in a random array (in a shuffled state) in the card container portion 18. The cut card CC is inserted in this batch of cards C. The cut card CC indicates the time to end use of each of the plurality of decks (e.g., four decks, six decks or eight decks) on the table. When the cut card indicating the time to end a round of game play appears, the subsequent cards are not used for the game.

When the cut card CC appears, a need arises to replace the cards C in the card container portion 18 with a new batch of cards in the plurality of decks. Accordingly, it is necessary to report the appearance of the cut card (hereinafter referred to as "cut card appearance information") to the game monitoring pit or central monitoring room. Therefore, a code indicating that the card is the cut card CC is printed in the form of a mark (five marks in FIG. 6(b)) on opposite side portions of the cut card CC to enable read of the cut card CC in the card reading part 9. The number of marks and the positions of the marks can be changed as desired as long as the cut card CC is made discriminable from the other cards.

After read of the cut card CC in the card reading part 9 is performed, the communication control section 39 obtains cut card appearance information from the card reading part 9. The communication control section 39 is programmed so as to be able to transmit cut card appearance information after obtaining the cut card appearance information.

In the present embodiment, the cut card appearance information is temporarily stored in the memory 34 provided as temporary storage means, as are the information on the other ordinary cards C and the results of determination of the outcomes of games. When transmission is permitted by depressing the transmission permission button 14, the cut card appearance information temporarily stored in the memory 34 is transmitted to the main computer apparatus 3. Unlike read information on the ordinary cards C and the results of determination of the outcomes of games, the cut card appearance information may be set by a program or the like in the transmission setting section 40 of the control part 10 so that it is transmitted when necessary in relation to prevention of a fraudulent act without being temporarily stored in the memory 34 and without waiting for the operation of the transmission permission button 14.

The card reading device 2 in the present embodiment described above enables elimination of a communication cable and a power supply cable such as those in the conventional arrangement. Moving the card reading device 2 in a so-called participatory tabletop game is facilitated thereby.

That is, in the present embodiment, information on cards read by the card reading part 9 and information on a game outcome determined by the control part 10 are transmitted from the wireless output part 13 to an external device (main computer apparatus 3 or the like) via wireless communication and, therefore, the need for a communication cable such as that in the conventional arrangement is eliminated. The need for a power supply cable such as that in the conventional arrangement is also eliminated since electric power is supplied from the battery 15 to the control part 10, the first display part 11, the second display part 12 and the wireless output part 13. Thus, according to the present invention, the need for a communication cable and a power supply cable such as those in the conventional arrangement can be eliminated. As a result, the operation to move the card reading device 2 from a position in front of a dealer to a position in front of a game participant in a so-called participatory tabletop game is facilitated. Moreover, the operation to place the card reading device 2 on the game table and maintenance operations are facilitated. Further, prevention of the occurrence of malfunctions due to the conventional communication cable and power supply cable is enabled.

The card reading device 2 in the present embodiment includes the transmission setting section 40 that determines timing of transmission in the wireless output part 13 and, therefore, enables transmission of information on cards and information on a game outcome at a suitable timing. For example, after read of a predetermined number of cards by the card reading part 9, information on the cards and information on a game outcome can be transmitted at a suitable timing. Alternatively, information on cards and information on a game outcome can be transmitted at a suitable timing determined by a program.

The card reading device 2 in the present embodiment has the battery 15 attached to the cover 23. Therefore, the cover 23 with the battery 15 can be replaced with another cover 23 to which a charged battery 15 is attached when the cover 23 is removed for the purpose of replacing the cards C in the card container portion with a plurality of new decks of cards after the completion of a round of game play. Prevention of failure to charge the battery 15 or failure to replace the battery 15 with a charged battery 15 can be achieved in this way. In such a case, it is possible to prevent the occurrence of the worst state in which the remaining charges in the battery 15 and the auxiliary battery 16 are so reduced in the course of a round of game play (before the appearance of a cut card) that the game is discontinued.

In the present embodiment, opening of the cover 23 can be appropriately detected with the detection notification section 41 in the card reading device 2. It is important to appropriately detect opening of the cover 23 in preventing unauthorized access to the cards C in the card container portion. The control part 10 makes such a setting that when opening of the cover 23 is detected as described above, the communication control section 39 makes the wireless output part 13 transmit a notice of this. The communication control section 39 also has a function to transmit the amount of charge in the battery 15 or the auxiliary battery 16 and a function to transmit information on a state where each of the amounts of charge in the batteries is equal to or smaller than a predetermined value.

Since the card reading device 2 in the present embodiment has the auxiliary battery 16, it can be supplied with electric power from the auxiliary battery 16 instead of from the battery 15 when the battery 15 is removed or the amount of remaining charge in the battery 15 is small. Also, since the card reading device 2 in the present embodiment has the battery switching circuit 17, it can be appropriately supplied with electric power from one of the battery 15 and the auxiliary battery 16 or from both the battery 15 and the auxiliary battery 16.

In the tabletop game system 1 in the present embodiment, a plurality of card reading devices 2 can be suitably managed by one main computer apparatus 3. In the present embodiment, a code expressing information on each card is printed at the opposed two sides of the card along a direction in which the card is drawn out. Therefore, the code printed on the card can be appropriately read.

The embodiment of the present invention has been described by way of example. The scope of the present invention is not limited to the described embodiment. Changes and modifications can be made in the embodiment according to purposes within the scope described in the claims.

While the embodiment of the present invention presently considered preferable has been described, it is to be understood that various changes can be made in the present embodiment, and the appended claims are intended to include all such changes within the scope of the true spirit of the present invention.

INDUSTRIAL APPLICABILITY

As described above, the card reading device according to the present invention has the effect of facilitating moving the card reading device in a participatory tabletop game, is used in a tabletop game system used for a participatory tabletop game or the like performed in a casino or the like, and useful.

REFERENCE SIGNS LIST

1 Tabletop game system
2 Card reading device
3 Main computer apparatus
4 Wireless communication interface
5 Identification section
6 Acceptance determination section
7 Housing
8 Card shoe part
9 Card reading part
10 Control part
11 First display part
12 Second display part
13 Wireless output part
14 Transmission permission button
15 Battery
16 Auxiliary battery
17 Battery switching circuit
18 Card container portion
19 Opening
20 Floor
21 Front wall
22 Card pressing member
23 Cover
24 Receiving portion 25 Terminal
26 Card reading sensor part
27 Card guide surface
28 Card guide rail
29 Sensor cover
30 Black-light sensor (UV sensor)
31 Object detection sensor
32 Measurement effectiveness determination sensor
33 Counter
34 Memory
35 Number identification section
36 Normal passage determination section
37 Outcome determination section
38 Display control section
39 Communication control section
40 Transmission setting section
41 Detection notification section
42 Power supply control section

The invention claimed is:

1. A card reading device comprising:
a card shoe part having a card container portion that contains a plurality of cards, having an opening through which the cards can be taken out one by one from the card container portion onto a game table and a cover receiving portion provided with a terminal;
a card reading part in which information on the cards is read from each of the cards;
a control part that determines an outcome of a card game based on the information on the cards;
a display part that outputs the outcome of the card game;
a wireless output part that wirelessly transmits, to an external device, the information on the cards, the outcome of the card game determined by the control part, and an ID which identifies the card reading device; and
a detachable cover having a battery secured thereto, wherein the detachable cover is configured to be received by the cover receiving portion of the card shoe part such that the battery supplies electric power to the control part, the display part, and the wireless output part through the terminal and the detachable cover covers the card container portion when the detachable cover is received by the cover receiving portion,
wherein the card shoe part, the card reading part, the control part, the display part, and the wireless output part can be placed on the game table by being integrally combined with each other, the card reading device further comprising an auxiliary battery that supplies electric power to the control part and the wireless output part when the battery and the detachable cover are removed from the card reading device or when the amount of charge in the battery becomes equal to or smaller than a predetermined threshold value.

2. The card reading device according to claim 1, further comprising a transmission setting section that determines a timing of a transmission in the wireless output part.

3. The card reading device according to claim 2, wherein the transmission setting section determines the timing of the transmission so that after a predetermined number of the cards is read by the card reading part, the information read from the cards is transmitted.

4. The card reading device according to claim 2, wherein the transmission setting section determines the timing of the transmission by a predetermined program.

5. The card reading device according to claim 1, further comprising a battery switching part that controls the electric power so that the electric power to the control part and the wireless output part is supplied from one of the battery and the auxiliary battery or from both the battery and the auxiliary battery.

6. The card reading device according to claim 1, further comprising a detection notification section that detects opening of the cover and transmits a notice of the occurrence of the opening of the cover to the external device through the wireless output part.

7. A tabletop game system comprising a card reading device and a main computer apparatus, the card reading device including:
a card shoe part having a card container portion that contains a plurality of cards, having an opening through which the cards can be taken out one by one from the card container portion onto a game table and a cover receiving portion provided with a terminal;
a card reading part in which information on the cards is read from each of the cards;
a control part that determines an outcome of a card game based on the information on the cards;
a display part that outputs the outcome of the card game;
a wireless output part that wirelessly transmits, to the main computer apparatus, the information on the cards, the outcome of the card game determined by the control part, and an ID which identifies the card reading device; and
a detachable cover having a battery secured thereto, wherein the detachable cover is configured to be received by the cover receiving portion of the card shoe part such that the battery supplies electric power to the control part, the display part, and the wireless output part through the terminal and the detachable cover covers the card container portion when the detachable cover is received by the cover receiving portion,
wherein the card shoe part, the card reading part, the control part, the display part, and the wireless output part can be placed on the game table by being integrally combined with each other, the card reading device further comprising an auxiliary battery that supplies electric power to the control part and the wireless output part when the battery and the detachable cover are removed from the card reading device or when the amount of charge in the battery becomes equal to or smaller than a predetermined threshold value, and
the main computer apparatus includes an acceptance determination section that receives the information transmitted from the wireless communication part in the card reading device and accepts the information on the outcome of the game transmitted from the card reading device if the received ID coincides with an ID set in advance.

8. The tabletop game system according to claim 7, further comprising a plurality of the card reading devices, and one common computer apparatus as the main computer apparatus with respect to the plurality of the card reading devices,
wherein the plurality of the card reading devices each have IDs different from each other, each ID for identification of the corresponding card reading device, and
wherein the main computer apparatus includes an identification section that identifies the IDs of the plurality of the card reading devices.

9. The tabletop game system according to claim 7, wherein the card reading device further comprises a transmission setting section that determines a timing of a transmission in the wireless communication part.

10. The tabletop game system according to claim 9, wherein the transmission setting section determines the timing of the transmission so that after a predetermined number of the cards is read by the card reading part, the information read from the cards is transmitted.

11. The tabletop game system according to claim 9, wherein the transmission setting section determines the timing of the transmission by a predetermined program.

12. The tabletop game system according to claim 7, wherein the card reading device further comprises a battery switching part that controls the electric power so that the electric power to the control part and the wireless output part is supplied from one of the battery and the auxiliary battery or from both the battery and the auxiliary battery.

13. A tabletop game system comprising a plurality of cards, a card reading device, and a main computer apparatus, each of the plurality of the cards having a code expressing information on the card, the code being attached to one surface of the card in ink reactive to ultraviolet light, the card reading device:
   a card shoe part having a card container portion that contains a plurality of cards, having an opening through which the cards can be taken out one by one from the card container portion onto a game table and a cover receiving portion provided with a terminal;
   a card reading part in which information on the cards is read from each of the cards;
   a control part that determines an outcome of a card game based on the information on the cards;
   a display part that outputs the outcome of the card game;
   a wireless output part that wirelessly transmits, to an external device, the information on the cards, the outcome of the card game determined by the control part, and an ID which identifies the card reading device; and
   a detachable cover having a battery secured thereto, wherein the detachable cover is configured to be received by the cover receiving portion of the card shoe part such that the battery supplies electric power to the control part, the display part, and the wireless output part through the terminal and the detachable cover covers the card container portion when the detachable cover is received by the cover receiving portion,
   wherein the card shoe part, the card reading part, the control part, the display part, and the wireless output part can be placed on the game table by being integrally combined with each other, the card reading device further comprising an auxiliary battery that supplies electric power to the control part and the wireless output part when the battery and the detachable cover are removed from the card reading device or when the amount of charge in the battery becomes equal to or smaller than a predetermined threshold value,
and
   the main computer apparatus includes an acceptance determination section that receives the information transmitted from the wireless communication part in the card reading device and accepts the information on the outcome of the game transmitted from the card reading device if the received ID coincides with an ID set in advance.

14. The tabletop game system according to claim 13, wherein the code expressing the information on each of the cards is printed at two opposite sides of the card along a direction in which the card is drawn out.

15. The tabletop game system according to claim 13, further comprising a plurality of the card reading devices, and one common computer apparatus as the main computer apparatus with respect to the plurality of the card reading devices,
   wherein the plurality of the card reading devices each have IDs different from each other, each ID for identification of the corresponding card reading device, and
   wherein the main computer apparatus includes an identification section that identifies the IDs of the plurality of the card reading devices.

16. The tabletop game system according to claim 13, wherein the card reading device further comprises a transmission setting section that determines a timing of a transmission in the wireless communication part.

17. The tabletop game system according to claim 16, wherein the transmission setting section determines the timing of the transmission so that after a predetermined number of the cards is read by the card reading part, the information read from the cards is transmitted.

18. The tabletop game system according to claim 16, wherein the transmission setting section determines the timing of the transmission by a predetermined program.

19. The tabletop game system according to claim 13, wherein the card reading device further comprises a battery switching part that controls the electric power so that the electric power to the control part and the wireless output part is supplied from one of the battery and the auxiliary battery or from both the battery and the auxiliary battery.

* * * * *